United States Patent
Sutty et al.

(10) Patent No.: US 12,456,939 B2
(45) Date of Patent: Oct. 28, 2025

(54) DEVICE AND METHOD FOR AUTOMATIC DETECTION AND CONFIGURATION OF A MOTOR

(71) Applicant: GE Precision Healthcare LLC, Wauwatosa, WI (US)

(72) Inventors: Jerome Sutty, Verrières le Buisson (FR); Xavier Tardivel, Marly-le-Roi (FR); Benjamin Ranaivoson, Guyancourt (FR)

(73) Assignee: GE Precision Healthcare LLC, Wauwatosa, WI (US)

( * ) Notice: Subject to any disclaimer, the term of this patent is extended or adjusted under 35 U.S.C. 154(b) by 223 days.

(21) Appl. No.: 18/374,800

(22) Filed: Sep. 29, 2023

(65) Prior Publication Data

US 2025/0112570 A1    Apr. 3, 2025

(51) Int. Cl.
*H02P 7/06* (2006.01)
*A61B 6/00* (2006.01)
*H02P 1/04* (2006.01)

(52) U.S. Cl.
CPC ............ *H02P 7/06* (2013.01); *A61B 6/4476* (2013.01); *A61B 6/54* (2013.01); *H02P 1/04* (2013.01)

(58) Field of Classification Search
CPC . H02P 7/06; H02P 1/04; A61B 6/4476; A61B 6/54
See application file for complete search history.

(56) References Cited

U.S. PATENT DOCUMENTS

| | | |
|---|---|---|
| 6,570,358 B2 | 5/2003 | Nakatsugawa et al. |
| 7,777,443 B2 | 8/2010 | Shinomoto et al. |
| 8,354,808 B2 | 1/2013 | Uebel et al. |
| 8,947,034 B2 | 2/2015 | Chretien et al. |
| 9,970,426 B2 | 5/2018 | Kim et al. |

(Continued)

FOREIGN PATENT DOCUMENTS

| | | | |
|---|---|---|---|
| CN | 107241049 A | 10/2017 | |
| CN | 210249857 | * 4/2020 | ............... A61B 6/00 |
| CN | 210249857 U | 4/2020 | |

(Continued)

OTHER PUBLICATIONS

CN210249857U English Abstract; Espacenet.com May 6, 2025; 1 page.

(Continued)

*Primary Examiner* — David P Porta
*Assistant Examiner* — Fani Polyzos Boosalis
(74) *Attorney, Agent, or Firm* — Boyle Fredrickson, S.C.

(57) ABSTRACT

According to one aspect of an exemplary embodiment of the disclosure, an imaging device or system includes at least one motor controlled by a motor drive. The motor is selected from one of multiple motors operable by the motor drive. A motor controller is operative to output a modulated voltage to the motor, where the modulated voltage does not cause rotation of the motor. As the motor controller outputs the modulate voltage, either the resultant voltage or the resultant current through the motor is measured. The motor controller uses the measured voltage or current to identify which of the multiple motors is connected to the motor controller and set at least one parameter in the motor controller corresponding to the identified motor.

20 Claims, 8 Drawing Sheets

(56) References Cited

U.S. PATENT DOCUMENTS

| | | | |
|---|---|---|---|
| 10,359,472 B2 | | 7/2019 | Trolle et al. |
| 2020/0060632 A1 | | 2/2020 | Blaski et al. |

FOREIGN PATENT DOCUMENTS

| | | | | | |
|---|---|---|---|---|---|
| CN | 114759812 A | * | 7/2022 | ............. | H02M 5/44 |
| EP | 3736973 A1 | * | 11/2020 | ................ | H02P 3/00 |
| WO | 2010105794 A2 | | 9/2010 | | |
| WO | 2018135746 A1 | | 7/2018 | | |

OTHER PUBLICATIONS

EP application 24199977.0 filed Sep. 12, 2024—extended Search Report issued Feb. 6, 2025; 8 pages.
Odhano S A et al: "Self-commissioning of interior permanent magnet synchronous motor drives with high-frequency current injection" 2013 IEEE Energy Conversion Congress and Exposition, IEEE, Sep. 15, 2013, pp. 3852-3859, XP032516877.
WO2018135746 English Abstract; Espacenet.com May 6, 2025; 1 page.

* cited by examiner

DEVICE AND METHOD FOR AUTOMATIC DETECTION AND CONFIGURATION OF A MOTOR

FIELD OF THE DISCLOSURE

The present disclosure relates generally to medical imaging systems, including mammography systems and devices, and more specifically to automatic detection and configuration of a motor used with a medical imaging device.

BACKGROUND OF THE DISCLOSURE

Embodiments of the invention relate generally to X-ray medical imaging, and more particularly to devices, systems and methods employed to perform various imaging procedures, such as mammography imaging procedures including but not limited to spectral mammography (SM), such as 2D/3D dual-energy contrast-enhanced (CE) mammography exams, full-field digital mammography (FFDM) or digital breast tomosynthesis (DBT) mammography exams.

Spectral mammography (SM) is an X-ray imaging modality used to scan breasts for screening, diagnosis and/or interventional examinations. The effectiveness of spectral mammography is affected by numerous factors, one of which is the two-dimensional (2D) rendering of images obtained using SM.

Alternative systems to SM are also known for breast imaging. Some examples include full-field digital mammography, which captures the image directly onto a flat-panel detector, computed radiography, which involves the use of a cassette that contains an imaging plate), or digital breast tomosynthesis (DBT). A digital breast tomosynthesis (DBT) or mammography-tomography (mammo-tomo) system is a dedicated mammography system that acquires several (e.g., tens of) angularly offset projection X-ray images and uses the resulting X-ray image data to reconstruct three-dimensional (3D) image datasets.

The 3D image datasets are used to form various volumetric representations of the imaged breast, including an entire 3D volume of the breast, and various 3D sections of the 3D volume, such as slices or slabs constituting specified thicknesses of the 3D volume oriented to provide the desired view of one or more regions of interest (ROI) detected within the 3D image dataset.

In addition, when the 3D image datasets of the breast have been produced, after being utilized in a suitable diagnosis procedure, they can be utilized to guide a biopsy device employed with the DBT system into the breast to obtain a biopsy of the region of interest (ROI) identified within the 3D image datasets. In DBT systems, the biopsy device is disposed directly on the DBT system in order to be able to perform the biopsy utilizing the 3D image dataset to guide the biopsy device to the ROI.

With regard to the use of mammography devices, the process of obtaining high quality mammographic images from breast tissue requires a technician to position the breast of a patient between one or more paddles and/or support surfaces that compress the breast in order to immobilize and flatten it during image acquisition. The compression force applied to a breast improves image quality by reducing the thickness of the breast while spreading the breast tissue over a larger area, which facilitates interpretation of obtained imagery since the amount of overlying tissue for structures within the imaged breast is minimized.

In many diagnostic mammography imaging devices, such that disclosed in US Patent Application Publication No. US20200060632, entitled Apparatus And Method For Mammographic Breast Compression, the entirety of which is expressly incorporated herein by reference for all purposes, the compression of the breast on the mammography imaging device is controlled by the technician using a footswitch with a binary positioning system, i.e., the footswitch is moveable between an "on" position to cause movement of the compression paddle(s) and an "off" position where the compression paddle(s) are stationary. When the footswitch is on the "on' position, the paddle(s) is moved towards the breast along a first axis under the full operational speed of the motor operably connected to the paddle(s) until contact of the paddle(s) with the breast is detected. In addition to, or alternatively to the footswitch, the mammography imaging device may include a fine movement adjustment knob. Rotation of the knob by the technician causes the paddle to move towards or away from the breast at a speed less than full operational speed of the motor, providing finer control than with the footswitch to more accurately position the paddle against the breast to achieve the desired compressive force on the breast.

In addition, to control of the paddles along the first axis for compression of the breast tissue, the imaging device may include controls for positioning the imaging head. Once the breast tissue is positioned, the imaging head may need to be located in a specific orientation with respect to the breast tissue to obtain a desired image. The imaging head may be located on a gantry allowing, for example, lateral and longitudinal positioning with respect to the breast tissue in a two-dimensional coordinate system. Optionally, the imaging head may be rotatable with respect to the breast tissue. The imaging head may first positioned in two-dimensions and then configured to pivot about the desired location or the imaging head may be rotated in an arc about the breast tissued to obtain a desired angle at which the image is to be acquired.

Each of the motions of the imaging device is achieved by a motor and a controller for the motor. Commonly motors and motor controllers are provided in pairs. By providing the motor and motor controller as a pair, the motor controller may be pre-configured with parameters to optimize performance of the motor. Over time the motor may wear and/or need replacement. When replacement is required, a motor of the same make and model as the original motor may not be available. Supply chain issues, for example, may cause the original motor to be unavailable for an unknown period of time. Alternately, the lifetime of the original may be of a length such that a new version of the motor is being offered by the original manufacturer. Whatever the reason for a duplicate of the original motor being unavailable, selecting a motor other than a motor of the same make and model as the original motor may result in a motor having significantly different operating characteristics.

The physical construction of a motor determines many of the operating characteristics of the motor. A Direct Current (DC) motor, for example, has an armature resistance, armature inductance, back-emf constant, and a motor torque constant which are based on the physical construction of the motor. Values for these operating characteristics of the motor may be stored as parameters in the motor controller. The motor controller may then use these parameter values to generate an output voltage to achieve desired operation of the motor. By providing the motor and motor controller as a pair, the values for the operating characteristic of the original motor are stored in the motor controller. However, when a motor is changed, the prior values stored in the motor controller may no longer correspond to the operating characteristics of the new motor. Using parameter values from the original motor which do not correspond to the operating characteristics of the new motor may result in reduced performance or even unstable operation of the new motor.

Therefore, with regard to the aforementioned shortcomings of prior art motor controllers for imaging systems, it is desirable to develop an improved device, system and method for the identifying a motor connected to the motor controller and adjusting parameters for the motor corresponding to operating characteristics of the identified motor.

SUMMARY OF THE DISCLOSURE

According to one aspect of an exemplary embodiment of the present disclosure, an x-ray imaging detector includes an axis of motion, a DC motor operative to drive a portion of the x-ray imaging detector on the axis of motion, and a motor controller operative to control rotation of the DC motor. The motor controller includes a memory operative to store a plurality of instructions, and a processor operative to execute the plurality of instructions. The processor is operative to output a modulated DC voltage to the DC motor, where the modulated DC voltage does not cause rotation of the DC motor. Either a voltage or a current is measured through the DC motor as the modulated DC voltage is output, and the DC motor is identified as a function of the voltage or current measured through the DC motor.

According to still another aspect of an exemplary embodiment of the present disclosure, a method of identifying a DC motor for an x-ray imaging device outputs a modulated DC voltage to the DC motor from a motor controller, where the modulated DC voltage does not cause rotation of the DC motor. Either a voltage or a current is measured through the DC motor with the motor controller as the modulated DC voltage is output, and the DC motor is identified as a function of the voltage or current measured through the DC motor.

According to still another aspect of an exemplary embodiment of the present disclosure, a method of identifying a DC motor for an x-ray imaging device selectively enables a first and second pair of switching devices with a motor controller. When the first pair of switching devices is enabled, a DC voltage having a first polarity is output to the DC motor, and when the second pair of switching devices is enabled, a DC voltage having a second polarity is output to the DC motor, where the second polarity opposite the first polarity. Either a voltage or a current through the DC motor is measured with the motor controller as the first and second pair of switching devices are selectively enabled. The DC motor is identified as a function of the voltage or current measured through the DC motor.

These and other exemplary aspects, features and advantages of the invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE DRAWINGS

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present.

Further, while the embodiments disclosed herein are described with respect to a mammography apparatus for the 2-dimensional imaging of breast tissue, it is to be understood that embodiments of the invention may be applicable to other types of imaging devices for both 2-dimensional and 3-dimensional imaging including, for example, fluoroscopy, full-filed digital mammography, digital breast tomosynthesis (DBT) and spectral mammography (single or multi-energy), as well as for imaging procedures for tissue other than breast tissue.

Figure 1:
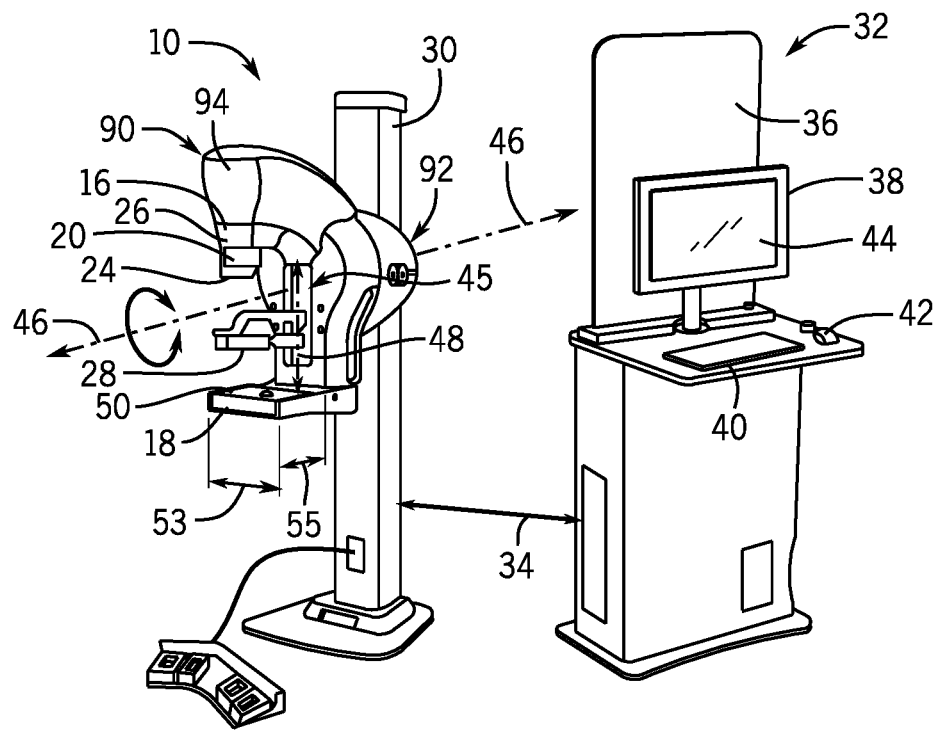
FIG. 1 is a perspective view of an imaging device in the form of a mammography apparatus for imaging the breast tissue of a patient, in accordance with an embodiment of the disclosure.
Figure 2:
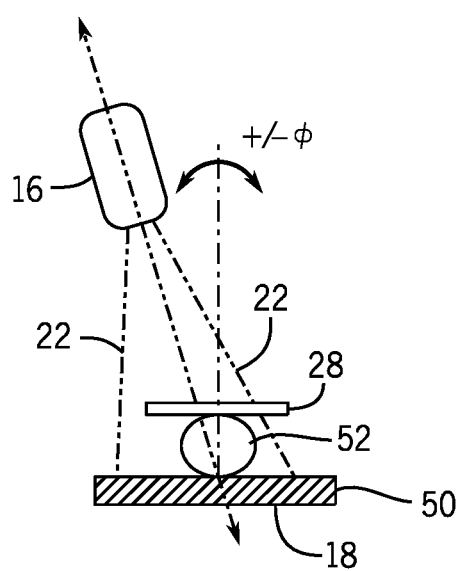
FIG. 2 is a diagram of the system of FIG. 1, showing the radiation source of the system in a scanning position, in accordance with an embodiment of the disclosure.
Figure 3:
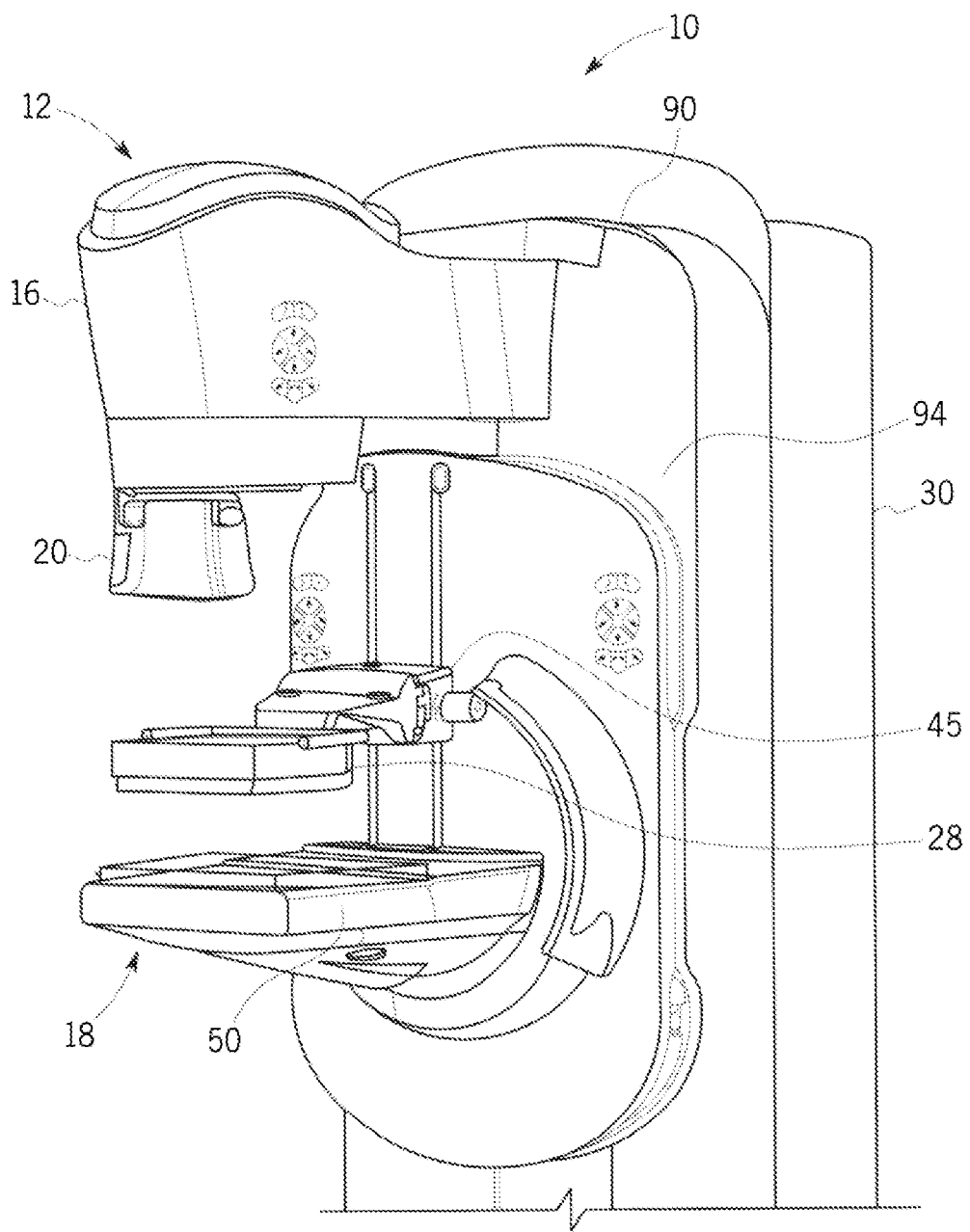
FIG. 3 is an isometric view of the mammography system of FIG. 1 including a first embodiment of a breast holding pad thereon in accordance with an embodiment of the disclosure.

Referring now to FIGS. 1-3, the major components of an exemplary imaging system 10 formed as a mammography system 12 for imaging breast tissue according to an embodiment of the invention are shown. The system 10, such that disclosed in US Patent Application Publication No. US20200060632, entitled Apparatus And Method For Mammographic Breast Compression, the entirety of which is expressly incorporated herein by reference for all purposes, includes a radiation source/x-ray source 16, a radiation detector 18, and a collimator 20. The radiation source 16 is movable between a variety of imaging positions relative to the detector 18 and is operative to emit radiation rays 22 (FIG. 2) that are received by the radiation detector 18 to provide an image of an object, such as a breast 52. In embodiments, the system 10 may include a patient shield 24 mounted to the radiation source 16 via face shield rails 26 to prevent the patient's head from obstructing the radiation rays and protecting the patient from the radiation rays 22.

Referring still further to FIGS. 1 and 2, the system 10 also includes a compression paddle or plate 28 and a support structure 30 to which one or more of the radiation source 16, radiation detector 18, and/or compression plate 28 may be mounted. In embodiments, the system 10 may further include a controller 32. The controller 32 may be a workstation having at least one processor/central processing unit/computer and a memory device/database that stores information and/or instructions for the operation of the system 10 that are employed by the controller 32, as shown in FIG. 1 or, in other embodiments, the controller 32 may be embedded/integrated into one or more of the various components of the system 10 disclosed above. In embodiments, the controller 32 may be in electrical communication with the radiation source 16, radiation detector 18, and/or the compression plate 28 via a cable 34. As will be appreciated, in embodiments, the connection 34 may be a wireless connection. In embodiments, the controller 32 may include a radiation shield 36 that protects an operator of the system 10 from the radiation rays 22 emitted by the radiation source 16. The controller 32 may further include a display 38, a keyboard 40, mouse 42, and/or other appropriate user input devices that facilitate control of the system 10 via a user interface 44.

As further shown in FIGS. 1 and 2, the radiation source 16, along with the radiation detector 18, forms part of an x-ray system which provides x-ray imagery for the purpose of imaging a body part of a patient, such as breast 52. As stated above, the radiation source 16 emits the radiation rays 22 such that the radiation rays 22 travel from the radiation source 16 to the radiation detector 18. While the radiation rays 22 are discussed herein as being x-rays, it is to be understood that the radiation source 16 may emit other types of electromagnetic rays which can be used to image a patient. The radiation source 16 may be mounted to the support structure 30 such that the radiation source can rotate around an axis 46 in relation to the radiation detector 18, although movement of the radiation source 16 in paths other than rotation about a fixed axis, such as during digital breast tomosynthesis (DBT), are also envisioned. In embodiments, the radiation detector 18 may be configured to rotate or translate within its housing, such as in the directions indicated by arrows 53 and 55.

In the illustrated exemplary embodiment of FIG. 1 the radiation source 16 and the detector 18 are mounted to a gantry 90 that is secured to the support structure 30. The support structure 30 houses a translation mechanism 92 that is operably connected to the gantry 90. The translation mechanism 92 is operable to move the gantry 90 vertically with respect to the support structure 30 in order to position the gantry 90 at the appropriate height to accommodate the dimensions of the patient on which the system 10 is being utilized. The translation mechanism 92 is also operable to rotate the gantry 90 relative to the support structure 30 about the horizontal axis 46 in order to position the gantry 90 rotationally with regard to the patient, as necessary.

The gantry 90 includes a generally C-shaped body 94 with the radiation source 16 at one end and the detector 18 at the opposite end. In this configuration, regardless of the vertical and/or rotational orientation of the gantry 90, such as to position the radiation source 16 and detector 18 relative to the patient breast 52 to obtain x-ray images at various orientations, such as for craniocaudal (CC) or mediolateral oblique (MLO) views, among others, the radiation source 16 is disposed in alignment with the detector 18. In this position, the detector 18 is capable of receiving the x-rays 22 emitted from the radiation source 16 that pass through the portion of the patient, i.e., patient breast 52, located between the radiation source 16 and the detector 18 in order to generate image data for transmission to the controller 32 of the mammography device/system 10 to create/reconstruct a 3D image dataset for viewing by a physician, such as by using DBT, among other known methods.

Additionally, in another embodiment the radiation source 16 can be attached to the gantry 90 to rotate and/or move independently of the gantry 90 and detector 18 in order to enable the radiation source 16 to take x-ray images of the patient breast at various angles relative to the detector 18, e.g., between +/−60°. The images obtained between these angles for the radiation source 16 can be used either for creation of stereoscopic images in a biopsy procedure using the system 10 or for DBT when operating the system 10 in an imaging mode.

As stated above, the radiation detector 18 receives the radiation rays 22 emitted by the radiation source 16. In embodiments, data regarding the radiation rays 22 received by the radiation detector 18 may be electrically communicated to the controller 32 from the radiation detector 18 via cable/electronic connection 34 such that the controller 32 generates one or more images which may be shown on the display 38 and stored in the memory device.

The compression plate 28 is operative, in response to instruction from the controller 32 or in response to instructions from controller(s) on or near the mammography system 10 or switch controllers 80, to move towards and away from the radiation detector 18 as indicated by arrows/compression axis 48 such that the compression plate 28 flattens and holds a body part, e.g., breast 52, in place against the surface 50 of the radiation detector 18. In this respect, the radiation detector 18 and the surface 50 thereof is referred to herein as a "compression surface or support plate" that cooperates with the compression plate 28 to compress and clamp a breast of a patient therebetween.

In one exemplary embodiment, in order to maintain the position of the patient breast 52 stationary during the imaging and/or biopsy procedures, the compression plate 28 is attached to a plate or paddle support mechanism 45 located on and/or within the gantry 90 that positions the compression plate 28 directly over and in alignment with the detector 18/support plate and operably connected to the controller 32. The plate support mechanism 45 is operable within the gantry 90 at any rotational or vertical position of the gantry 90 to move the plate 28 in a line either towards or away from the detector 18/support plate. The mechanism 45 can have any of a number of different configurations, but in one exemplary embodiment takes the form of a compression screw mechanism that is operable to move the plate 28 into engagement with the patient breast 52 to exert a predetermined pressure/compression on the breast 52 to retain the breast 52 in a stationary position between the plate 28 and the detector 18/support plate during imaging and/or biopsy procedures.

Figure 4:
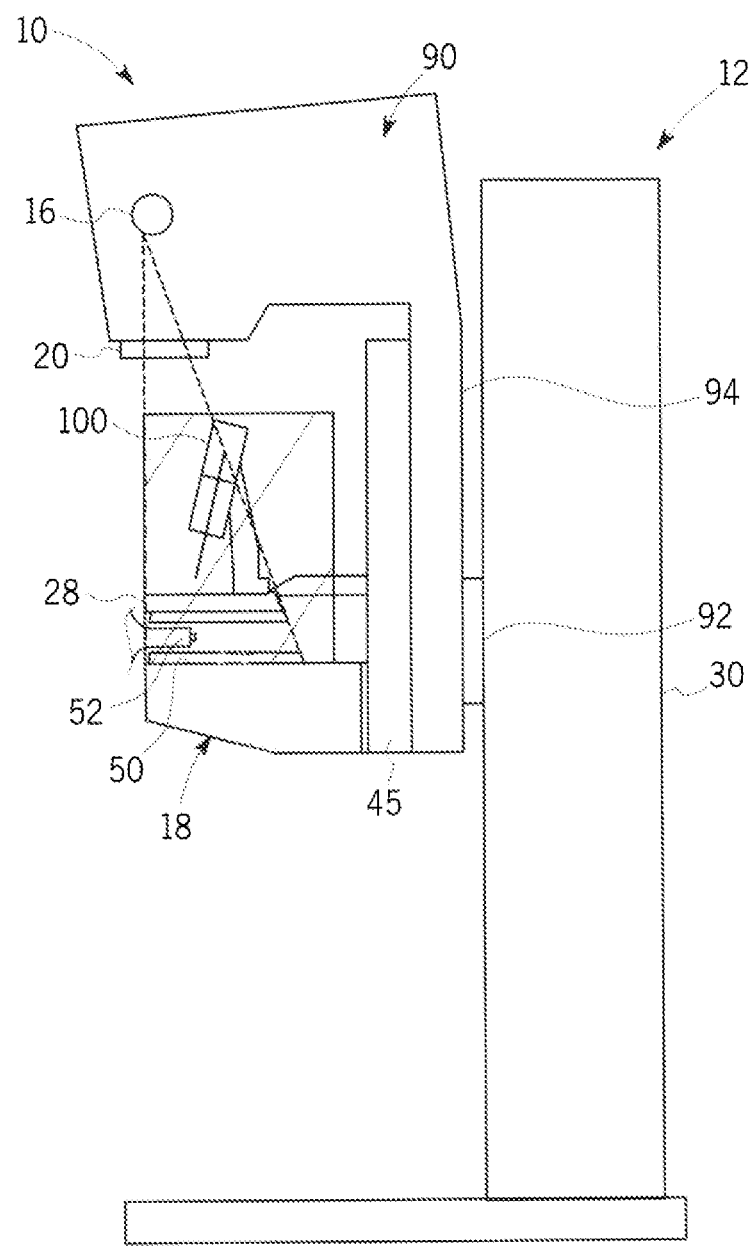
FIG. 4 is an isometric view of another embodiment of the mammography system and breast holding pad of FIG. 3 including a biopsy device, in accordance with an embodiment of the disclosure.

Referring now to FIG. 4, the imaging system 10 may further, or alternatively, include a biopsy tool 100, such as that disclosed in which may be selectively removable from the imaging system 10. In such an embodiment, the radiation source 16, along with the radiation detector 18, forms part of an x-ray system which provides x-ray imagery for the purpose of guiding the biopsy tool 100 to a suspect site within a body part of a patient. As shown in FIG. 4, in embodiments, the biopsy tool 100, may be disposed on the support structure 30 such that it also rotates about the axis 46, in a manner similar to the radiation source 16, and/or moves in a vertical and/or horizontal direction, in a manner similar to the compression plate 28.

The imaging system described above includes multiple axes of motion. As discussed, the radiation source 16 may rotate about a first axis 46 of motion. The compression plate 28 may move toward or away from the radiation detector 18 along a second axis 48 of motion. The radiation detector 18 may be configured to translate along a pair of axes, denoted by arrows 53 and 55. The above axes are exemplary and not intended to be limiting. Various other axes of motion may exist in an imaging system according to the application requirements. As used herein, an axis of motion refers to an axis on which a portion of the imaging system moves. The portion of the imaging system may be translated along the axis, rotated about the axis, or a combination thereof. Further, a portion of the imaging system may be moved along multiple axes of motion.

Figure 5:
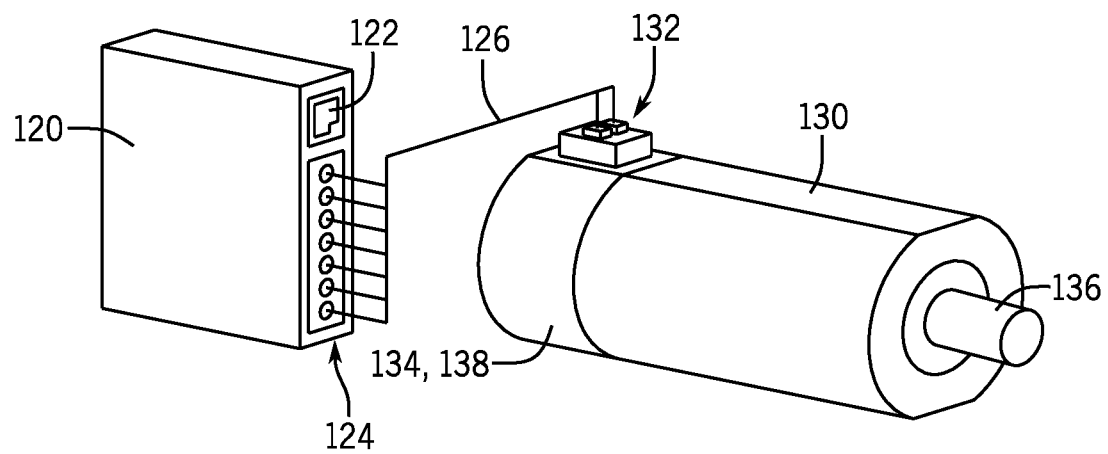
FIG. 5 is an isometric view of an exemplary motor and a motor controller used for controlling one axis of motion in the mammography system of FIG. 1.

Motion along or about one of the axes of motion requires a driving force to move the portion of the imaging system 10 on the axis of motion. Turning next to FIG. 5, one exemplary system for driving a portion of the imaging system 10 is illustrated. A motor controller 120 is provided to drive a motor 130 operatively connected to the motor controller 120. The motor controller 120 receives a command from an external source, such as the controller 32 for the imaging system 10. The command may be received via a communication network connected at a network port 122 or via any other suitable cable, wireless connection, or combination thereof. Terminals 124 from the motor controller 120 provide an interconnection to the motor 130. A single cable 126 may run between the motor controller 120 and the motor 130. The single cable includes multiple conductors to carry voltage to the motor 130, command signals to accessory devices, such as a brake 138, mounted on the motor and/or to receive feedback signals from the motor 130. A position feedback device 134 such as an encoder, for example, may be mounted on the motor 130 and provide a signal corresponding to an angular position of the motor 130. A drive shaft 136 extends from the motor 130 and may be coupled to a gearbox, another drive shaft, a drive belt, a drive chain, or any other suitable drive member to drive the portion of the imaging system 10 to which the motor 130 is connected.

The motor 130 is mounted on the imaging system 10 within or proximate to the portion of the imaging system 10 being controlled. For example, a motor may be mounted within the support structure 30 or on the gantry 90 to drive the translation mechanism 92 which causes the gantry to move up and down the support structure. Similarly, a second motor 130 may be mounted within the support structure 30 or within the gantry 90 to drive the translation mechanism 92, causing rotation of the gantry relative to the support structure. The motor controller 120 for each motor 130 may be mounted within the support structure 30 or gantry 90 proximate the motor 130 being controlled. Optionally, the motor controller 120 may be mounted within the controller 32 for the imaging system 10 and cabling between the motor controller 120 and the motor 130 may be included in the cable/electronic connection 34 between the controller 32 and the support structure 30.

Figure 6:
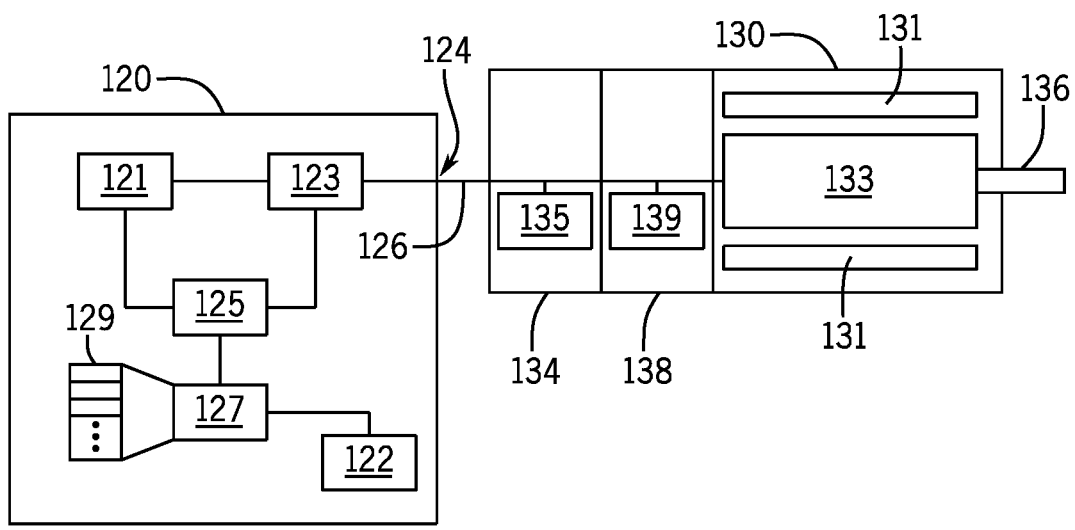
FIG. 6 is a block diagram representation of the exemplary motor and motor controller of FIG. 5.

With reference also to FIG. 6, the motor controller 120 includes a power source 121 and a power conversion section 123. The power source 121 may be a battery, contained within the motor controller 120. Optionally, the battery may be rechargeable via a connection to an electrical service within the building in which the imaging system is installed. A power cable may be run to the imaging system and a battery charger may be incorporated within the imaging system. Optionally, the battery may be removed from the imaging system for charging, where multiple batteries may be available and swapped into the system as required. According to still another aspect of the invention, the power source 121 may be connected directly to and receive power from the electrical service. The power source 121 may include a first power converter may receive an Alternating Current (AC) voltage, such as one hundred twenty volts (120 VAC) or two hundred forty volts (240 VAC), and convert the AC voltage to a Direct Current (DC) voltage. The first power converter may include a passive rectifier having devices such as diodes which conduct or block current based on voltage levels rather than conducting responsive to control signals. Optionally, the first power converter may include an active rectifier having devices such as transistors which selectively conduct current according to control signals provided to one of the terminals of the device. The power source 121 may further include one or more power converters, such as a buck converter or boost converter to convert a DC voltage from one voltage level to another, and/or one or more voltage regulators to supply voltage at a desired voltage level according to the requirements of the imaging system 10.

The motor controller 120 further includes a processor 125 and memory 127. The processor 125 may be a single processor or multiple processors executing asynchronously or synchronously. The processor 125 may be a microprocessor or may be implements in a field programmable gate array (FPGA), application specific integrated circuit (ASIC), or other suitable processing device. The memory 127 may be a single memory device or multiple memory devices, where at least a portion of the memory is non-transitory memory. The memory 127 is configured to store instructions for execution by the processor 125 and to store parameters corresponding to desired operation of the motor controller 120 and/or the motor 130.

According to one aspect of the invention, the motor 130 is a DC motor. The DC motor 130 includes a stator 131 and a rotor 133. The stator 131 is stationary and generates a magnetic field in which the rotor 133 rotates. The stator 131 may include, for example, a magnetic structure with a north pole facing the rotor 133 on one side of the motor 130 and a south pole facing the rotor 133 on the opposite side of the motor 130. The magnetic structure establishes a constant magnetic field within the motor 130. Optionally a field coil may be provided in the stator 131. The motor controller 120 may be configured to supply a DC current to the field coil, establishing a magnetic field through the DC motor when the current is conducted in the field coil.

The motor 130 may include additional components connected to the motor. According to the illustrated embodiment, a brake 138 and a position feedback device 134, such as a resolver or an encoder, are both connected on one end of the motor 130. The brake 138 includes a control circuit 139 configured to receive a control signal to selectively open or close the brake. Typically, a coil within the brake 138 is energized to open the brake 138, allowing the rotor 133 to rotate. When the coil is de-energized, the brake 138 sets, applying a holding force on the rotor 133 to prevent rotation of the motor 130. The brake control circuit 139 may also include one or more feedback signals to the motor controller 120 to provide verification of the current operating state of the brake 138. Optionally, the brake control circuit 139 may be included entirely within the motor controller 120. The cable 126 between the motor controller 120 and the brake 138 may include a pair of electrical conductors connected to the brake coil to energize or de-energize the brake. The position feedback device 134 also includes a control circuit 135. The control circuit 135 of the position feedback device 134 detects rotation of the motor 130 and outputs a feedback signal corresponding to the rotation. The output signal may be, for example, a sinusoidal signal or a pair of offset sinusoidal signals where one rotation of the motor caused the sinusoidal signal to pass through one complete cycle or three hundred and sixty degrees. Optionally, the output signal may be converted to a pulse train or a quadrature pulse train providing a number of pulses per revolution of the motor. The motor controller 120 receives the feedback signal and executes instructions including one or more control routines utilizing the feedback signal to achieve desired operation of the motor.

Figure 7:
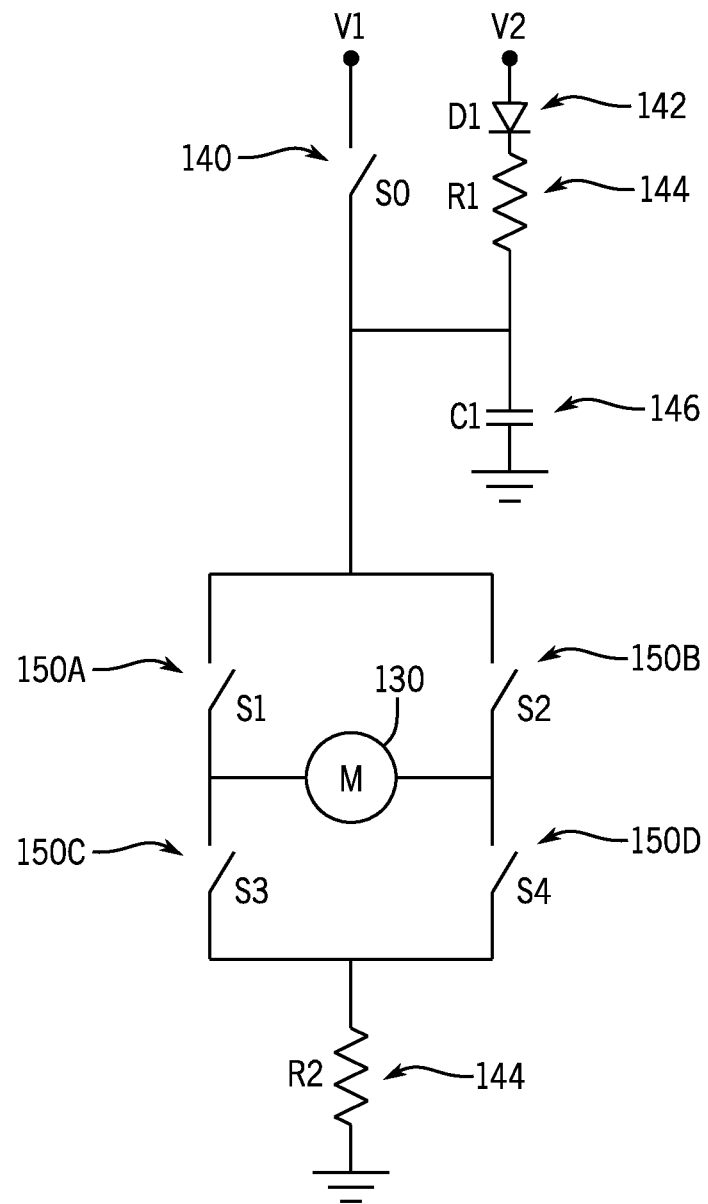
FIG. 7 is a schematic representation of a portion of the motor controller of FIG. 6.

With reference also to FIG. 7, the power conversion section 123 of the motor controller 120 is configured to supply a desired output voltage to the motor 130 to control rotation of the motor. For the exemplary DC motor 130, the power conversion section 123 includes an H-bridge configuration. The H-bridge includes four electronic switching devices 150. As illustrated in FIG. 7, a first electronic switching device defines, at least in part, switch one, S1, also identified by reference numeral 150A; a second electronic switching device defines, at least in part, switch two, S2, also identified by reference numeral 150B; a third electronic switching device defines, at least in part, switch three, S3, also identified by reference numeral 150C; and a fourth electronic switching device defines, at least in part, switch four, S4, also identified by reference numeral 150D. As used herein, a reference numeral used without a letter refers generally to a single element or to each element of multiple like elements. A reference numeral used with a letter refers to a specific instance of an element. Using the electronic switching devices 150 introduced above as an example, reference to an electronic switching device 150 or to electronic switching devices 150 refers generally to each electronic switching device, while referring to a first electronic switching device 150A, a second electronic switching device 150B, a third electronic switching device 150C, or a fourth electronic switching device 150D refers to a specific instance of the electronic switching devices 150. The electronic switching devices 150 may be implemented by transistors such as bipolar junction transistors (BJTs), metal-oxide semiconductor field-effect transistors (MOSFETs), insulated gate bipolar transistors (IGBTs), or the like. The transistors receive a reference voltage at one of their terminals and a switching signal at another of their terminals to selectively conduct the reference voltage through the device.

In operation, the motor controller 120 is operative to control operation of the motor 130. For a brushed DC motor, an armature is wound on the rotor 133 with terminals of the winding connected to a rotating commutator. The rotating commutator is split such that one half of the commutator connects to one end of the armature and the other half of the commutator connects to the other end of the armature. The cable 126 from the motor controller 120 supplies voltage to stationary brushes mounted within the motor 130. When DC voltage is applied across the brushes in a first polarity, the current flows through the armature in the motor 130 in a first direction. When the DC voltage is applied across the brushes in a second polarity, opposite the first polarity, the current flows through the armature in the motor 130 in a second direction, opposite the first direction. The current through the armature creates an electromagnetic field that interacts with the electromagnetic field generated by the magnetic structure present in the rotor 133. The polarity of the current determines the direction of rotation of the motor.

With reference again to FIG. 7, the switches 150 in the H-bridge are closed in pairs to supply voltage through the motor 130 in a desired polarity. A reference voltage is provided at the top of the circuit. The first electronic switching device 150A and the fourth electronic switching device 150D define a first pair of electronic switching devices. The second electronic switching device 150B and the third electronic switching device 150C define a second pair of electronic switching devices. When the first pair of electronic switching devices are both closed and the second pair of electronic switching devices are both open, the reference voltage is present at the left side of the motor 130 and a common, or ground, voltage is present at the right side of the motor, causing current to flow through the motor in a first polarity. When the second pair of electronic switching devices are both closed and the first pair of electronic switching devices are both open, the reference voltage is present at the right side of the motor 130 and the common, or ground, voltage is present at the left side of the motor, causing the current to flow through the motor in a second polarity, opposite the first polarity. The terms top, left, and right are relational terms used with respect the schematic illustration of FIG. 7 and are not intended to denote a physical relationship or orientation of the motor 130, motor controller 120, or any connection therebetween.

The speed at which the motor 130 rotates is a function of the amplitude of the DC voltage provided to the motor 130. The motor controller 120 controls desired operation of the motor 130 by varying the level of voltage applied to the motor 130. The level of voltage is varied by modulating the output voltage to the motor 130. Modulation alternately connects and disconnects the reference voltage to the motor. Modulation occurs within a periodic interval, where the voltage is connected for a portion of the interval and disconnected for a portion of the interval. When zero speed is desired, the reference voltage is not connected for any portion of the interval or, in other words, the reference voltage is connected for zero percent of the interval. When rated speed is desired, the reference voltage is connected for one hundred percent of the interval. If, however, a speed other than zero speed or rated speed is desired, the motor controller 120 alternately connects and disconnects the reference voltage within the periodic interval. Closing one pair of the electronic switching devices may only connect the full voltage across the motor. However, if one pair of electronic switching devices is closed for a first portion of the periodic interval and open for the other portion of the periodic interval, the average voltage across the motor during one period corresponds to the percentage of the period that the pair of electronic switching devices is closed. The resultant voltage to the motor appears to be the average voltage. Maintaining a modulated output voltage where one pair of electronic switching devices is closed between one and ninety-nine percent causes motor 130 to rotate in a range of one to ninety-nine percent of rated speed.

The present invention utilizes a modulated output voltage to determine what motor 130 is connected to the motor controller 120. As an initial step, the amplitude of DC voltage supplied to the motor 130 is selected. As discussed above, providing a rated DC voltage to the motor 130 will cause the motor to rotate at rated speed. The circuit illustrated in FIG. 7, however, includes two different reference voltages. A first reference voltage, $V_1$, is connected to the H-bridge via a switch, S0, also identified by reference numeral 140. Switch zero 140 is defined, at least in part, by an active electronic switching device such as a transistor. The active electronic switching device receives a command signal to selectively connected the first reference voltage, $V_1$, to the H-bridge. A second reference voltage, $V_2$, is also connected to the H-bridge. The second reference voltage, $V_2$, charges a capacitor, $C_1$, also identified by reference numeral 146, according to a time constant defined by the values of a resistor, $R_1$, also identified by reference numeral 144, and the capacitor, $C_1$, 146. When the capacitor 146 is charged, the amplitude of voltage present across the capacitor, $C_1$, will be equal to the amplitude of voltage from the second reference voltage, $V_2$. The second reference voltage, $V_2$, is connected to the H-bridge via a diode, D1, also identified by reference numeral 142, which serves as a passive electronic switching device.

Selection of a voltage to be applied to the H-bridge is controlled by the active electronic switching device of switch zero 140. The first reference voltage, $V_1$, is selected according to the motor 130 to be controlled. According to one aspect of the invention, the motor 130 operates with a rated DC voltage of forty-eight volts (48 VDC). $V_1$ is, therefore, a DC voltage having an amplitude of 48 VDC provided from the power source 121. The second reference voltage, $V_2$, is selected with an amplitude less than 48 VDC. According to one aspect of the invention, the second reference voltage is selected with an amplitude of fifteen volts (15 VDC). As may be observed from the schematic illustration in FIG. 7, when switch zero 140 is open, no voltage from the first reference voltage, $V_1$, reaches the H-bridge. Similarly, no voltage from the first reference voltage is present at the cathode of the diode, $D_1$. The voltage potential from the second reference voltage, $V_2$, will forward bias the diode, $D_1$, supplying the second reference voltage to the H-bridge. When switch zero 140 is closed, the voltage from the first reference voltage, $V_1$, is provided to H-bridge. Because the amplitude, or potential, of the voltage from the first reference voltage is greater than the amplitude, or potential, of the voltage from the second reference voltage, the diode, $D_1$, is reversed biased preventing the second reference voltage from being provided to the H-bridge.

During the motor detection process, the modulated DC voltage supplied from the motor controller 120 to the motor 130 does not cause rotation of the DC motor. As an initial step in supplying a modulated DC voltage that does not cause rotation of the DC motor, selecting the second reference voltage, $V_2$, utilizes a reference voltage having a lower amplitude than the first reference voltage. As discussed above, the speed at which a DC motor rotates is determined, at least in part, by the amplitude of the DC voltage applied. Therefore, supplying a DC voltage with a lower maximum voltage, reduces the value of the modulated voltage as well. Thus, for motor detection, the motor controller 120 opens switch zero 140, connecting the second reference voltage, $V_2$, to the H-bridge.

Figure 8A:
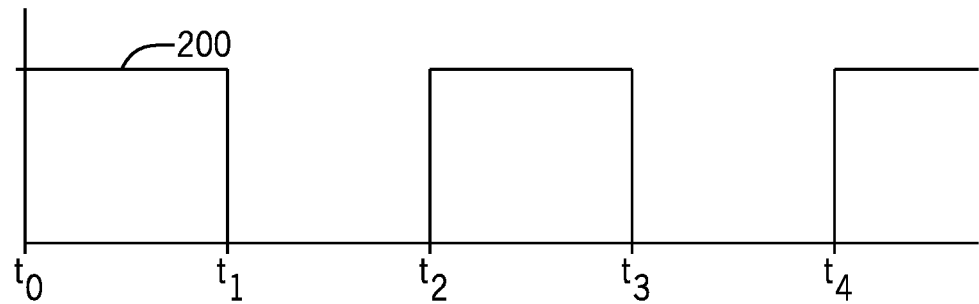
FIG. 8A is a graphic representation of a switching signal for one pair of switches in the H-bridge shown in FIG. 7.
Figure 8B:
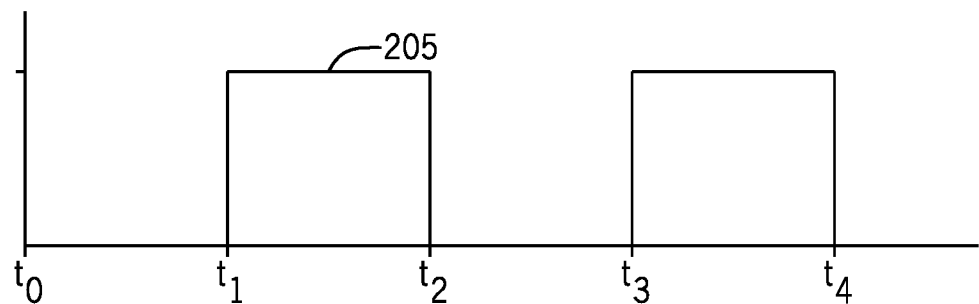
FIG. 8B is a graphic representation of a switching signal for one pair of switches in the H-bridge shown in FIG. 7, where the pair of switches controlled by the switching signal in FIG. 8B is complementary to the pair of switches controlled by the switching signal in FIG. 8A.
Figure 8C:
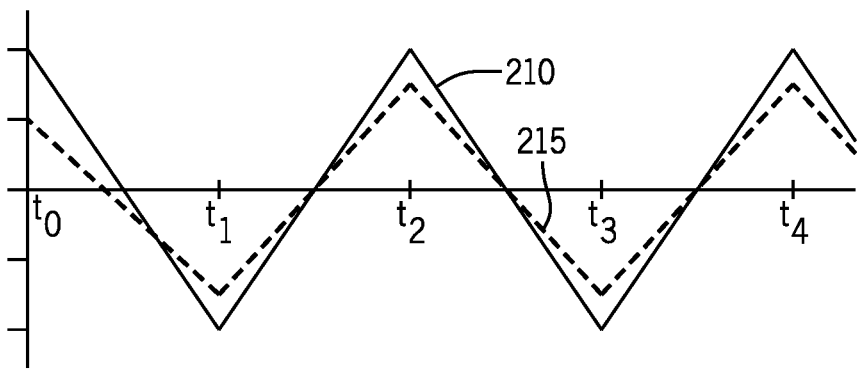
FIG. 8C is a graphic representation of current through two different DC motors being controlled by the switching signals of FIGS. 8A and 8B.
Figure 9:
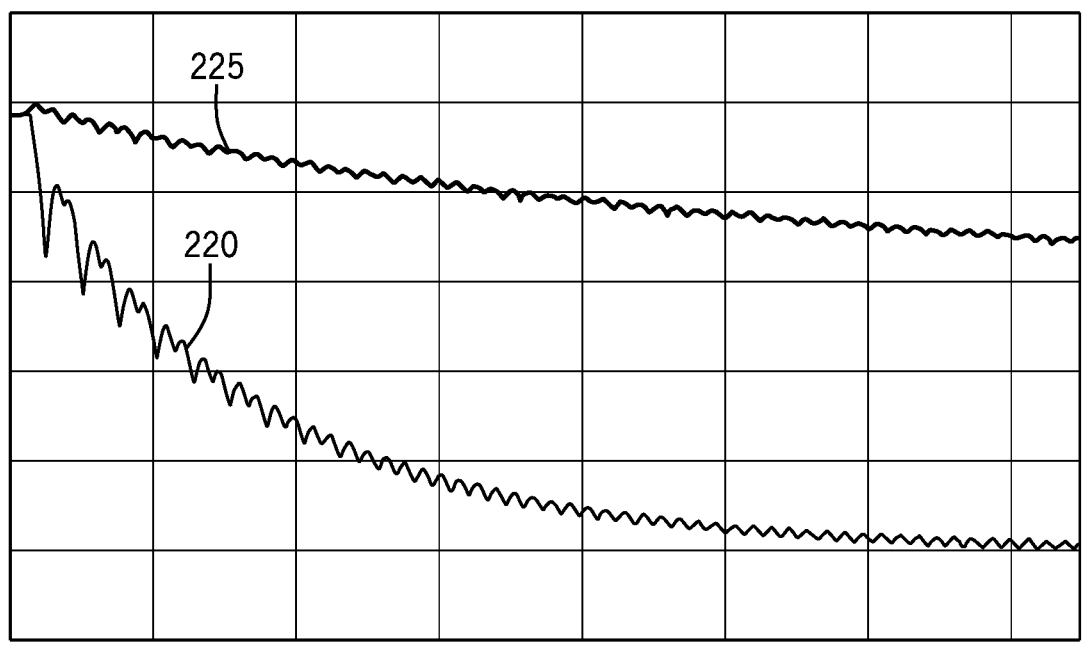
FIG. 9 is a graphic representation of voltage discharge from a capacitor connected to two different DC motors being controlled by the switching signals of FIGS. 8A and 8B.
Figure 10:
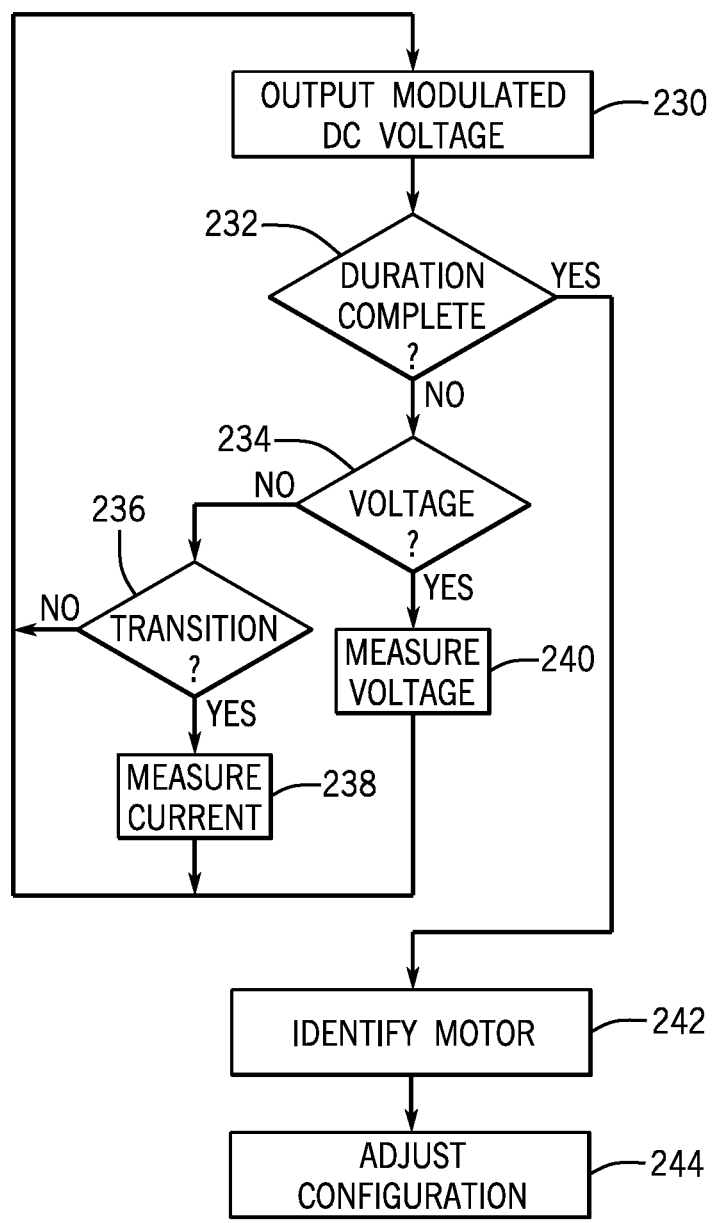
FIG. 10 is a flow diagram illustrating steps for detecting and configuring a motor according to one embodiment of the invention.

Turning next to FIGS. 8-10, modulation of the H-bridge is also controlled to prevent rotation of the DC motor. As shown in step 230, the motor controller 120 outputs a modulated DC voltage. The modulated DC voltage utilizes the second reference voltage, $V_2$, and is alternately connected to the H-bridge according to the control signals shown in FIGS. 8A and 8B. A first switching signal 200 is provided to the first electronic switching device 150A and the fourth electronic switching device 150D as a first pair of switching devices. A second switching signal 205 is provided to the second electronic switching device 150B and the third electronic switching device 150C as a second pair of electronic switching devices. As discussed above, when the first pair of electronic switching devices is closed, the voltage from the second voltage reference, $V_2$, is applied across the motor 130 with a first polarity. When the second pair of electronic switching devices is closed, the voltage from the second voltage reference, $V_2$, is applied across the motor 130 with a second polarity, opposite the first polarity. In contrast to the modulation utilized to control rotation of the motor, where the voltage is selectively applied to one pair of switches for a portion of a switching period, the voltage during motor detection is alternately provided to each pair of switches, continually reversing the polarity of voltage applied to the motor. The resulting DC current through a DC motor is illustrated in the plots 210, 215 shown in FIG. 8C. The current first transitions from a positive current to a negative current. The current then transitions from a negative current to a positive current. The current continues to oscillate between a small positive value and a small negative value, maintaining an average value approximately equal to zero current in the motor.

Turning again to FIG. 10, the motor controller 120 is configured to output the modulated DC voltage to the motor 130 for a predefined duration. As shown in step 232, the motor controller 120 monitors when the predefined duration is complete. If the duration is complete, the motor controller 120 jumps to step 238 to identify the motor, as will be discussed further below. If, however, the predefined duration is not complete, the motor controller 120 then measures either the voltage or the current provided to the DC motor 130.

At step 234, the motor controller 120 first determines whether the current or the voltage is to be measured. If the current is to be measured, the motor controller 120 waits for a transition between outputting the first switching signal 200 and the second switching signal 205, as shown in step 236. If the transition between switching signals is not occurring, the motor controller 120 returns to step 230 and continues generating the modulated waveform according to the active switching signal 200, 205. When a transition between switching signals occurs, however, the motor controller 120 measures the current present in the motor 130 as shown in step 238. With reference again to FIG. 8C, a first plot 210 of current corresponds to current present in a first motor during the modulation process. A second plot 215 of current corresponds to current present in a second motor during the modulation process. As illustrated in FIG. 8C, the peak current, either positive or negative, occurs at the transition between switching signals. As a result, sampling at the transition point will generate the largest value of current and provide the greatest variation of sampled values between different motors. With reference also to FIG. 7, a current sensing resistor, R2, also identified by reference numeral 144, may be utilized to measure the current. A voltage across the resistor 144 is measured by the motor controller 120 and the current determined according to Ohm's law. Optionally, various other current sensors may be utilized to measure the current through the motor 130. As shown in FIG. 8C, different motors will respond to the modulated output voltage differently. A motor with a lower electrical time constant, which is determined as a function of the armature inductance and armature resistance in the DC motor, will have a higher peak amplitude of current, as demonstrated by the first plot 210. A motor with a higher electrical time constant will have a lower amplitude current, as demonstrated by the second plot 215. The motor controller 120 stores the values of the current while the output voltage was being delivered to the motor and uses the stored values of current to identify which motor is connected to the motor controller 120.

If the voltage is to be measured, the motor controller 120 proceeds to step 240. The motor controller 120 is configured to measure a voltage present across the capacitor 146 to obtain a value of the modulated output voltage being supplied to the motor 130. When the second reference voltage, $V_2$, is selected, the capacitor, $C_1$, 146 is charged to the DC voltage level of the second reference voltage, $V_2$, according to the time constant defined by the values of the resistor, $R_1$, 144 and the capacitor, $C_1$, 146. The capacitor 146 is charged to this DC voltage level before the modulated DC voltage is supplied to the motor 130. As the modulated DC voltage is supplied to the motor, the time constant defined by the values of the resistor, $R_1$, 144 and the capacitor, $C_1$, 146 is selected such that charging the capacitor 146 from the second reference voltage, $V_2$, occurs slower than discharging voltage from the capacitor 146 through the motor 130. As a result, the amplitude of voltage present across capacitor, $C_1$, 146 drops as the modulate DC voltage is supplied to the motor 130. With reference also to FIG. 9, the rate at which the voltage across the capacitor 146 drops is a function of the electrical time constant of the motor 130. FIG. 9 includes two plots of the voltage across the capacitor 146 with respect to time as the modulated DC voltage is output to different DC motors. A first plot 220 illustrates a DC motor 130 having a short electrical time constant, and a second plot 225 illustrates a DC motor 130 having a long electrical time constant, where short and long are relative to each other. With a shorter electrical time constant, the voltage level across the capacitor 146 will discharge more rapidly than with a longer electrical time constant. After about one millisecond (1 ms) of supplying the modulate DC voltage to the motor 130, the voltage level has diverged a sufficient amount that a measured value of the voltage present across the capacitor 146 may be used to identify which motor 130 is connected to the motor controller 120. The motor controller 120 stores the measured values of the modulated DC voltage provided to the DC motor 130 to identify which motor is connected to the motor controller 120.

As previously indicated, it is desirable to generate a modulated output voltage which does not cause rotation of the DC motor 130. In addition to reducing the amplitude of the voltage reference being applied, reducing the duration at which each switching signal 200, 205 is active will also reduce the opportunity for the motor 130 to begin rotating. According to one aspect of the invention, the switching signals 200, 205 may alternate during each period of the modulation. A first period of a modulation interval may extend between time $t_0$ and $t_1$. A second period of the modulation interval may extend between time $t_1$ and $t_2$ and so on. During the first period, the first switching signal 200 to the first pair of switching devices is on for the one hundred percent of the period. During the second period, the second switching signal 205 to the second pair of switching devices is on for one hundred percent of the duration of the period. According to another aspect of the invention, the first period of the modulation interval may extend between time $t_0$ and $t_2$, and a second period of the modulation interval may extend between time $t_2$ and $t_4$. If the duration of the modulation interval spans two time segments on the plots of FIGS. 8A and 8B, then each of the first switching signal 200 and the second switching signal 205 are on for fifty percent of the modulation interval. The first switching signal 200 is on for the first half of the interval, and the second switching signal 205 is on for the second half of the interval.

In either instance, the first and second switching signals 200, 205 alternate for consecutive periods with an overall fifty percent modulation between the two signals. In other words, the first switching signal 200 and the second switching signal alternate with each other and are on for the same duration of time as each other. The result of the modulation is a current in the motor alternately ramping up and down as the switching signals 200, 205 alternate. Because the armature coil in the DC motor 130 has some inductance, the current through the DC motor 130 resists step changes, but will ramp up and ramp down for the duration of the switching interval as a function of the voltage applied and the inductance present in the armature coil.

Referring back to FIG. 10, the modulated DC voltage is output and the current through the motor 130 is measured for the predefined duration. When the duration is complete, the motor controller 120 executes steps 242 and 244 to identify which motor is connected to the motor controller 120 and adjust the parameters stored in memory 127 accordingly. The memory 127 of the motor controller 120 is configured to store a lookup table 129, where the lookup table includes a number of motors 130 and at least one operating characteristic corresponding to each motor 130 stored in the lookup table. The operating characteristic may be the electrical time constant of the motor, which is determined as a function of the armature inductance and armature resistance in the DC motor. The motor controller 120 may be configured to determine a value of the electrical time constant for the motor as a function of either the measured voltage or the measured current. Optionally, expected values for the amplitude of the modulated DC voltage, when the voltage is measured, or expected peak values for current, when the current is measured, as the modulated DC voltage is output to the motor may be determined experimentally by the manufacturer of the motor controller 120 and stored in the motor controller 120 for a number of motors. When a new motor 130 is connected to the motor controller 120, the motor controller outputs the modulated DC voltage and compares the measured voltage or current to the expected voltage or current values stored in the lookup table to identify which motor is connected to the motor controller.

According to still another aspect of the invention, the motor controller 120 may be configured to rapidly modulate the switching signals to minimize the available time for the current through the motor to rise and fall. According to one aspect of the invention, the frequency at which the modulation occurs is greater than ten kilohertz (10 kHZ). If, for example, the motor controller 120 executes at a twenty kilohertz (20 kHz) switching frequency with a fifty percent modulation between the two signals, each signal remains on for just twenty-five microseconds (25 µs). During this short duration, the current may rise only a few tens or hundreds of a milliamp. With the reduced voltage level and low rise in current, sufficient power is not generated in the motor 130 to overcome the motor inertia and start rotation. Thus, the motor controller 120 is able to identify the motor connected without causing rotation of the motor.

According to yet another aspect of the invention, some motors 130 may include a brake 138 mounted to the motor. When a brake is mounted to the motor 130, the brake may remain set as the modulated output voltage is provided to the motor to assist in preventing rotation of the motor.

After identifying the motor, the motor controller 120 is able to adjust parameters stored in memory 127 which correspond to operation of the motor 130. The lookup table 129 used to identify the motor may further include a list of operating parameters for each motor 130. After identifying the motor 130, the motor controller 120 reads each of the parameters from the lookup table 129 and stores them in the corresponding parameters for controlling operation of the motor. Optionally, a second lookup table may be stored in memory, where the first lookup table 129 is used to identify a motor and a second lookup table stores operating parameters for the motor.

It is understood that the aforementioned compositions, apparatuses and methods of this disclosure are not limited to the particular embodiments and methodology, as these may vary. It is also understood that the terminology used herein is for the purpose of describing particular exemplary embodiments only, and is not intended to limit the scope of the present disclosure which will be limited only by the appended claims.

We claim:

1. An x-ray imaging detector, comprising:
   (a) an axis of motion; (b) a Direct Current (DC) motor operative to drive a portion of the x-ray imaging detector on the axis of motion; and (c) a motor controller operative to control rotation of the DC motor, wherein the motor controller further comprises: (i) a memory operative to store a plurality of instructions, and (ii) a processor operative to execute the plurality of instructions to: output a modulated DC voltage to the DC motor, wherein the modulated DC voltage does not cause rotation of the DC motor, measure either a voltage or a current provided to the DC motor as the modulated DC voltage is output, and identify the DC motor as a function of either the voltage or current provided to the DC motor.

2. The x-ray imaging detector of claim 1, further comprising: (a) a plurality of electronic switching devices to selectively provide the modulated DC voltage to the DC motor; (b) a first voltage source having a first amplitude; (c) a first voltage selection switch operative to selectively connect the first voltage source to the plurality of electronic switching devices; (d) a second voltage source having a second amplitude; and (e) a second voltage selection switch operative to selectively connect the second voltage source to the plurality of electronic switching devices.

3. The x-ray imaging detector of claim 1, wherein the motor controller further comprises: (a) a first electronic switching device; (b) a second electronic switching device; (c) a third electronic switching device; and (d) a fourth electronic switching device, wherein the processor is further operative to: (i) selectively enable the first electronic switching device and the fourth electronic switching device as a first pair of switching devices to output a DC voltage having a first polarity to the DC motor, and (ii) selectively enable the second electronic switching device and the third electronic switching device as a second pair of switching devices to output a DC voltage having a second polarity to the DC motor, the second polarity opposite the first polarity.

4. The x-ray imaging detector of claim 3, wherein the processor is further operative to alternately connect the first pair of switching devices and the second pair of switching devices.

5. The x-ray imaging detector of claim 4, further comprising a current sensor operative to generate a feedback signal corresponding to the current provided to the DC motor, wherein the processor is further operative measure the current when the processor is switching between the first pair of switching devices and the second pair of switching devices.

6. The x-ray imaging detector of claim 4, further comprising a voltage sensor operative to generate a feedback signal corresponding to the voltage provided to the DC motor.

7. The x-ray imaging detector of claim 4, wherein a frequency at which the processor alternately connects the first pair of switching devices and the second pair of switching devices is high enough to prevent rotation of the DC motor.

8. The x-ray imaging detector of claim 1, wherein: (a) the memory is further operative to store a lookup table, and (b) the processor is further configured to identify the DC motor by comparing either the voltage or the current measured through the DC motor to a value stored in the lookup table.

9. The x-ray imaging detector of claim 1, wherein (a) the memory is further operative to store at least one configuration parameter for the DC motor; and (b) the processor is further operative to set the at least one configuration parameter corresponding to the DC motor identified.

10. A method of identifying a DC motor for an x-ray imaging device, comprising the steps of: (a) outputting a modulated DC voltage to the DC motor from a motor controller, wherein the modulated DC voltage does not cause rotation of the DC motor; (b) measuring either a voltage or a current provided to the DC motor with the motor controller as the modulated DC voltage is output; and (c) identifying the DC motor as a function of either the voltage or current provided to the DC motor.

11. The method of claim 10, further comprising the steps of: (a) disconnecting a first voltage source from a plurality of electronic switching devices, wherein the plurality of electronic switching devices selectively provides the modulated DC voltage to the DC motor; and (b) connecting a second voltage source to the plurality of electronic switching devices.

12. The method of claim 10, wherein the step of outputting the modulated DC voltage further comprises the steps of: (a) selectively enabling a first pair of switching devices to output a DC voltage having a first polarity to the DC motor, and (b) selectively enabling a second pair of switching devices to output a DC voltage having a second polarity to the DC motor, the second polarity opposite the first polarity.

13. The method of claim 12, wherein the step of measuring the current further comprises measuring the current with a current sensor when the motor controller is switching between the first pair of switching devices and the second pair of switching devices, wherein the current sensor is operative to generate a feedback signal corresponding to the current in the DC motor.

14. The method of claim 12, wherein the motor controller alternately enables the first pair of switching devices and the second pair of switching devices at a frequency high enough to prevent rotation of the DC motor.

15. The method of claim 10, further comprising an initial step of charging a capacitor from a reference voltage prior to outputting the modulated DC voltage, wherein: (a) the step outputting the modulated DC voltage selectively connects the capacitor to the DC motor, and (b) the step of measuring the voltage measures the voltage across the capacitor.

16. The method of claim 10, wherein the step of identifying the DC motor further comprises comparing either the voltage or the current measured through the DC motor to a value stored in a lookup table in a memory of the motor controller.

17. The method of claim 10, further comprising the step of setting at least one configuration parameter corresponding to the DC motor identified, wherein the at least one configuration parameter is stored in a memory of the motor controller.

18. A method of identifying a DC motor for an x-ray imaging device, comprising: the steps of:
(a) selectively enabling a first pair of switching devices with a motor controller to output a DC voltage having a first polarity to the DC motor; (b) selectively enabling a second pair of switching devices with the motor controller to output a DC voltage having a second polarity to the DC motor, the second polarity opposite the first polarity; (c) measuring either a voltage or a current through the DC motor with the motor controller as the first and second pair of switching devices are selectively enabled; and (d) identifying the DC motor as a function of the voltage or current measured through the DC motor.

19. The method of claim 18, wherein the step of identifying the DC motor further comprises comparing either the voltage or the current measured through the DC motor to a value stored in a lookup table in a memory of the motor controller.

20. The method of claim 18, further comprising the step of setting at least one configuration parameter corresponding to the DC motor identified, wherein the at least one configuration parameter is stored in a memory of the motor controller.

* * * * *